United States Patent [19]
Shima et al.

[11] Patent Number: 5,736,733
[45] Date of Patent: Apr. 7, 1998

[54] LIGHT SENSOR CIRCUIT HAVING A PLURALITY OF SWITCHES FOR SELECTIVE CONNECTION BETWEEN A DETECTOR AND AN OUTPUT TERMINAL IN ALL COMBINATIONS OF A PLURALITY OF DETECTORS AND A PLURALITY OF OUTPUT TERMINALS

[75] Inventors: Toru Shima; Taiichiroh Fukuda, both of Kanagawa; Toshikazu Yoneyama, Tsurugashima, all of Japan

[73] Assignee: Nikon Corporation, Tokyo, Japan

[21] Appl. No.: 670,003

[22] Filed: Jun. 25, 1996

[30] Foreign Application Priority Data

Sep. 25, 1995 [JP] Japan .................................. 7-271844
Sep. 25, 1995 [JP] Japan .................................. 7-271845
Feb. 14, 1996 [JP] Japan .................................. 8-052410

[51] Int. Cl.$^6$ .................................................... H01J 40/14
[52] U.S. Cl. ............................ 250/208.2; 250/214 SW; 250/214 C
[58] Field of Search ................................ 250/208.1, 208.2, 250/214 SW, 214 C, 201.4

[56] References Cited

U.S. PATENT DOCUMENTS 5,045,686 9/1991 Iwanami et al. .

Primary Examiner—Stephone B. Allen
Attorney, Agent, or Firm—Foley & Lardner

[57] ABSTRACT

A photosensor circuit of the present invention comprises (i) a plurality of light receiving elements for detecting incident light; (ii) a plurality of output terminals for outputting photocurrents generated in the plurality of light receiving elements; (iii) a plurality of switches for selecting connection between the light receiving element and the output element in all combinations of the plurality of light receiving elements and the plurality of output terminals; and (iv) a shift register comprised of a plurality of nodes each controlling on/off of the plurality of switches. In this arrangement, when data of off or on is input into the plurality of nodes constituting the shift register, the switches corresponding to the nodes receiving the data of off are set to be off, and the switches corresponding to the nodes receiving the data of on are set to be on. Accordingly, this photosensor circuit can take a signal generated in an arbitrary light receiving element out of the plurality of light receiving elements out through an arbitrary output terminal out of the plurality of output terminals by the simple circuit structure.

16 Claims, 10 Drawing Sheets

LIGHT SENSOR CIRCUIT HAVING A PLURALITY OF SWITCHES FOR SELECTIVE CONNECTION BETWEEN A DETECTOR AND AN OUTPUT TERMINAL IN ALL COMBINATIONS OF A PLURALITY OF DETECTORS AND A PLURALITY OF OUTPUT TERMINALS

BACKGROUND OF THE INVENTION

1. Field of the Invention

The present invention relates to a photosensor (light sensor) circuit used for autofocus detection or measurement of light exposure in projection exposure apparatus for fabricating, for example, semiconductor devices, liquid-crystal display devices, and so on, various photographing apparatus, for example typified by microscopical photographing apparatus, and the like. More particularly, the invention concerns a photosensor circuit for properly performing the autofocus detection, measurement of light exposure, and so on, which is a photoelectric conversion device constructed as an integrated circuit including a shift register.

2. Related Background Art

Presently, the detection of autofocus (AF), for example, in the projection exposure apparatus, the photographing apparatus, and so on is carried out at multiple points on an object to be detected in order to focus an optical system on the detected object more accurately. For enabling the AF detection with reference to the multiple points, a sensor chip used is one including a lot of light receiving portions formed therein.

In an example of such a sensor chip, a plurality of switches are connected between the plural light receiving portions and an output terminal, and these plural switches are arranged to be selected by respective selection circuits. Supposing a certain switch is turned on by its selection circuit, a signal generated in a light receiving portion is sent through the switch to the output terminal. Namely, since there is only one output terminal, signals generated in the plural light receiving portions are not detected by plural systems, but are detected at a single portion.

Particularly, the AF detection in the semiconductor fabrication apparatus is required to be accurate in order to realize fine patterning, and therefore, the points for AF detection need to be changed to appropriate positions, depending upon configuration changes of various circuit patterns on a wafer as being the detected object. If there are only several types of detected objects, the detection can be made as changing conventional sensor chips one from another in its entirety.

Conventionally, for measuring the light exposure in the microscopical photographing apparatus and other photographing apparatus, for example, a photomultiplier is used to measure the quantity of light of the entire measured screen, or the quantity of light of a single spot fixed at the center or a point other than it of the measured screen, whereby the intensity of weak light can be measured. On the other hand, when a photodiode being a semiconductor device is used, the area inside the measured screen is segmented corresponding to the plural light receiving portions to divide the measuring range and photometry is carried out at plural points therein, which permits more appropriate determination of light exposure.

Further, normally, integrated circuit devices are often used as those including a dynamic shift register and other circuits within a same chip. For example, in writing data in a memory circuit or in reading the data out thereof, these operation is sometimes carried out as sequentially designating addresses by the shift register. In general, it is desired for an integrated circuit device to incorporate circuits having certain predetermined functions in a chip area as small as possible, and the dynamic shift registers of simple structure are thus frequently used as shift registers rather than static shift registers.

For example, if a dynamic shift register constructed of many CMOS inverters continuously connected is let to stand without refresh operation under power supply condition, it will come to saturate because of dark current. In this case some nodes in the circuit of dynamic shift register may take intermediate potentials between the lowest potential (for example, the ground potential) and the highest potential (for example, the power-supply potential) in the chip.

Large currents flow in the inverters input nodes of which are the nodes having the intermediate potentials. Here, if the dynamic shift register is incorporated in a circuit system always performing the refresh operation, the dynamic shift register will not saturate. Therefore, no large current flows in the circuit devices within the same chip.

SUMMARY OF THE INVENTION

An object of the present invention is to provide a photosensor circuit that can extract a signal generated in an arbitrary light receiving portion out of plural light receiving portions through an arbitrary output terminal out of plural output terminals by simple circuit structure.

Another object of the present invention is to provide a photosensor circuit that can extract a signal generated in a light receiving portion located properly corresponding to a configuration of a detected object out of plural light receiving portions through a desired output terminal out of plural output terminals by compact and simple circuit structure.

Still another object of the present invention is to provide a photosensor circuit that can measure the quantity of light, even for weak light intensity, in an arbitrary region selected on a light receiving surface while eliminating influence of dark current occurring in the circuit devices by simple structure of photoelectric conversion device.

A further object of the present invention is to provide a photosensor circuit that can suppress the negative effect on the other circuit devices, caused by a large current flowing between the power supply and the ground wiring of the dynamic shift register, without performing the refresh operation of the dynamic shift register in particular and by simple structure of integrated circuit apparatus.

In order to achieve the above objects, a photosensor circuit of the present invention comprises (i) a plurality of light receiving elements for detecting incident light; (ii) a plurality of output terminals for outputting photocurrents generated in the plurality of light receiving elements; (iii) a plurality of switches for selecting connection between the light receiving element and the output terminal in all combinations of the plurality of light receiving elements and the plurality of output terminals; and (iv) a shift register comprised of a plurality of nodes each controlling on/off of the plurality of switches.

In the photosensor circuit constructed in the above arrangement, when data of off or on is input into the plurality of nodes constituting the shift register, the switches corresponding to the nodes receiving the data of off are set to be off, and the switches corresponding to the nodes receiving the data of on are set to be on. Accordingly, a signal generated in an arbitrary light receiving element can be taken out through an arbitrary output terminal.

In a preferred example of the photosensor circuit of the present invention, a number of the plurality of light receiving elements and a number of the plurality of output terminals are m and n, respectively, and a number of the plurality of switches and a number of the plurality of nodes in the shift register both are m×n.

In another preferred example of the photosensor circuit of the present invention, the plurality of switches are arranged in a matrix of rows and columns corresponding to numbers of the plurality of light receiving elements and the plurality of output terminals.

A preferred example of the photosensor circuit of the present invention further comprises a plurality of memories each for switching on/off of the plurality of switches, based on data output from the plurality of nodes in the shift register, and a plurality of control circuits for controlling processing of writing the data output from the plurality of nodes in the shift register into the plurality of memories.

In the photosensor circuit constructed in the above arrangement, the data of on is input into the nodes corresponding to light receiving elements desired to give the output out of the plurality of nodes constituting the shift register and the data of off into the nodes corresponding to light receiving elements not desired to give the output. At this time, some memories are set in a write enable state by only control circuits connected to the output terminal desired to obtain the output while the other memories are set in a write disable state by the other control circuits. Therefore, only the switches each disposed between a desired light receiving element and a desired output terminal can be connected by writing the data in the plural nodes of the shift register into the memories in the write enable state through these control circuits.

In this case, a number of the plurality of light receiving elements and a number of the plurality of output terminals are m and n, respectively, numbers of the plurality of switches, the plurality of memories, and the plurality of control circuits all are m×n, and a number of the plurality of nodes in the shift register is m, desirably.

Further, the plurality of control circuits are enable circuits a number of which is coincident to a product of numbers of the plurality of light receiving elements and the plurality of output terminals, desirably.

In a preferred example of the photosensor circuit of the present invention, the plurality of output terminals comprise a plurality of signal outputting terminals for outputting signal charges generated in the plurality of light receiving elements and a charge draining terminal for draining unnecessary charges generated in the plurality of light receiving elements, and the plurality of switches comprise a plurality of signal outputting switches for selecting connection between the light receiving element and the signal outputting terminal in all combinations of the plurality of light receiving elements and the plurality of signal outputting terminals, and a plurality of charge draining switches for selecting connection between the light receiving element and the charge draining terminal in all combinations of the plurality of light receiving elements and the charge draining terminal.

In this case, the shift register complementarily controls on/off of the plurality of signal outputting switches and the plurality of charge draining switches, desirably.

In the photosensor circuit constructed in the above arrangement, the light receiving elements not selected by the signal outputting switches are selected by the charge draining switches, thereby properly removing the useless photocurrents. This prevents the charges accumulated in the light receiving elements not selected by the signal outputting switches from negatively affecting the measurement of light quantity thereafter.

In another preferred example of the photosensor circuit of the present invention, the plurality of light receiving elements are comprised of a plurality of pn junction diodes, each including a dopant diffuse region which is formed on a semiconductor substrate having a first conduction type and which has a second conduction type opposite to the first conduction type, and junction bias voltages between the semiconductor substrate and the plurality of dopant diffuse regions are set substantially at the zero volt.

In the photosensor circuit constructed in the above arrangement, the pn junction diodes constituting the plurality of light receiving elements each generate photocurrents in the magnitude according to the incident light, and measurement of light quantity of an arbitrary desired light receiving element is carried out as taking a photocurrent thereof out through an arbitrary output terminal. Since the junction bias voltages at this time between the dopant diffuse regions of the plural light receiving elements and the semiconductor substrate are set nearly at the zero volt, measurement of weak light can be properly conducted as suppressing occurrence of dark current caused by the reverse bias of pn junction diode.

In this case, the plurality of switches are comprised of a plurality of MOS transistors comprising respective drain regions and source regions formed on the semiconductor substrate and having the second conduction type, and junction bias voltages between the semiconductor substrate and, the plurality of drain regions and the plurality of source regions, are set substantially at the zero volt, desirably.

In the photosensor circuit constructed in the above arrangement, since the junction bias voltages between the drain and source regions of MOS transistors constituting the plural switches and the semiconductor substrate are set nearly at the zero volt, the negative effect of the dark current on the measurement of light quantity can be properly removed as suppressing occurrence of dark current caused by the reverse bias of pn junction.

More desirably, the plurality of output terminals comprise a plurality of signal outputting terminals for outputting signal charges generated in the plurality of light receiving elements and a charge draining terminal for draining unnecessary charges generated in the plurality of light receiving elements, and the plurality of switches comprise a plurality of signal outputting switches for selecting connection between the light receiving element and the signal outputting terminal in all combinations of the plurality of light receiving elements and the plurality of signal outputting terminals, and a plurality of charge draining switches for selecting connection between the light receiving element and the charge draining terminal in all combinations of the plurality of light receiving elements and the charge draining terminal, and the semiconductor substrate and the charge draining terminal are connected to a substrate bias potential source.

Further, the plurality of signal outputting terminals are connected through a resistance element to the substrate bias potential source, more desirably.

In the photosensor circuit constructed in the above arrangement, the bias voltage to the dopant diffuse regions of the plural light receiving elements is always set at the same value as the bias voltage of the semiconductor substrate, through the plural signal outputting switches or the plural charge draining switches. Thus, the junction bias voltages between the dopant diffuse regions of light receiving elements and the semiconductor substrate are always held nearly at the zero volt. Accordingly, it can properly prevent occurrence of dark current caused by the reverse bias of pn junction.

In another preferred example of the photosensor circuit of the present invention, the plurality of light receiving elements, the plurality of output terminals, the plurality of switches, and the shift register are constructed as an integrated circuit apparatus formed on a common chip, the shift register is constructed as a dynamic shift register, which comprises a first power-supply line connected to a first external connection terminal, and the plurality of light receiving elements and the plurality of switches comprise a second power-supply line connected to a second external connection terminal different from the first external connection terminal and separated from the first power-supply line.

In the photosensor circuit constructed in the above arrangement, the power-supply wiring of the dynamic shift register is separated from the power-supply wiring of the circuit elements other than the dynamic shift register, such as the plurality of light receiving elements and the plurality of switches. Thus, the other circuit elements are free of influence of change of the reference potential caused by a large current flowing in the power-supply wiring due to saturation of the dynamic shift register. Accordingly, there is no need to always perform the refresh operation of the dynamic shift register, which causes no increase of consumption current, and the circuit can operate as an integrated circuit apparatus of low consumption power and with high reliability.

In this case, the shift register comprises a first power-supply terminal and a first common or ground terminal as the first external connection terminal and the plurality of light receiving elements and the plurality of switches comprise a second power-supply terminal independent of the first power-supply terminal and a second common or ground terminal independent of the first common or ground terminal, as the second external connection terminal, desirably.

In the photosensor circuit constructed in the above arrangement, the power-supply systems are completely separated by making the power-supply terminal and the common or ground terminal of the dynamic shift register independent of the power-supply terminal and the common or ground terminal of the circuit elements other than the dynamic shift register. Therefore, it becomes possible to enhance the reliability as suppressing mutual effects between the dynamic shift register and the circuits other than it.

Further, a preferred example of the photosensor circuit of the present invention further comprises a switch element different from the plurality of switches, disposed between power-supply terminals and power-supply lines of the shift register and arranged as capable of being turned on or off based on a control signal input from the outside, wherein the plurality of light receiving elements, the plurality of output terminals, the plurality of switches, and the shift register are constructed as an integrated circuit apparatus formed on a common chip, wherein the shift register is constructed as a dynamic shift register, and wherein the switch element selects connection or interruption of power supply to the shift register so as to control connection of the shift register to the plurality of light receiving elements and the plurality of switches.

In the photosensor circuit constructed in the above arrangement, when the dynamic shift register is not used for operation, the switch elements are set to be off by the control signal from the outside, thereby interrupting power supply to the dynamic shift register. This prevents a large current from flowing in the power-supply wiring of the dynamic shift register due to saturation. Moreover, even when the power is supplied to the circuit elements other than the dynamic shift register, such as the plural light receiving elements and plural switches, the operation of the other circuits is free of the negative effect such as a change of the reference potential. Accordingly, there is no need to always perform the refresh operation of the dynamic shift register, there is no increase of consumption power because thereof, and the circuit can operate as an integrated circuit apparatus of low consumption power and with high reliability.

In this case, the shift register is constructed of a plurality of circuit stages comprising inverters, as continuously connected, and the switch element selects power supply to at least one of the inverters in the plurality of circuit stages in the shift register, desirably.

In the photosensor circuit constructed in the above arrangement, when the dynamic shift register is not operated, the switch elements interrupt the power supplied to at least one of inverters in the plural circuit stages constituting the shift register. This prevents a large current from flowing because of saturation of the dynamic shift register. Therefore, this arrangement can prevent the negative effect on the other circuit elements than the dynamic shift register.

DESCRIPTION OF THE PREFERRED EMBODIMENTS

Figure 1:
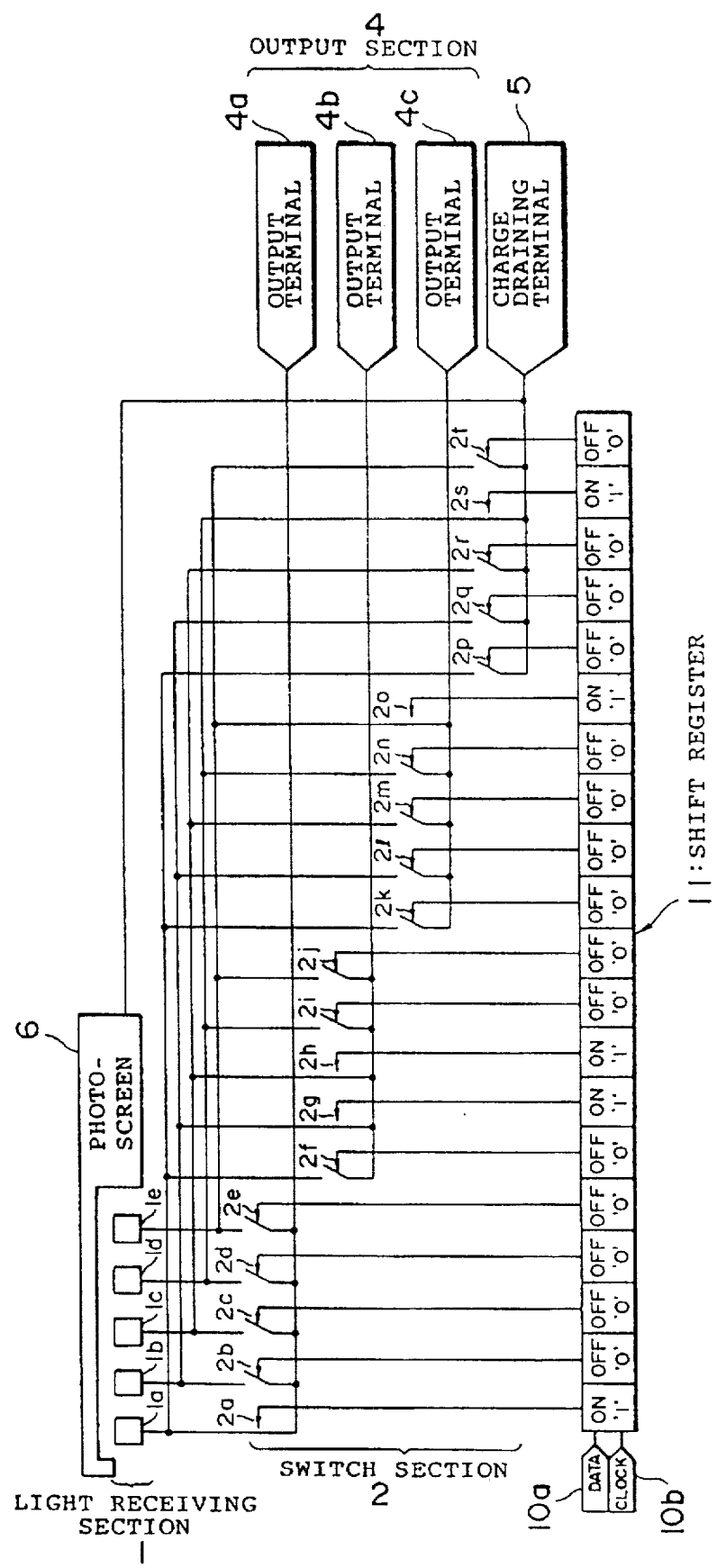
FIG. 1 is a block diagram to show the structure of the first embodiment associated with the photosensor circuit of the present invention.

The constitution and operation of the various embodiments associated with the photosensor circuit according to the present invention will be explained in detail with reference to FIG. 1 to FIG. 11. Here, same elements will be denoted by same reference numerals in the description with the drawing, and redundant description will be omitted. It is also noted that the dimensional ratios in the drawing are not always coincident with those in the description.

First Embodiment

As shown in FIG. 1, the photosensor circuit of the present embodiment has a light receiving section 1 consisting of five photodiodes 1a–1e disposed to face the measured object and an output section 4 consisting of three output terminals 4a–4c connected to the outside of chip. In addition, the photosensor circuit further has a switching section 2 consisting of twenty switches 2a–2t and a shift register 11 consisting of 20-stage nodes continuously connected, as a static control logic circuit.

The five photodiodes 1a–1e each are connected to one pole of five switches 2a–2e, respectively, and are connected in parallel through these switches to the output terminal 4a. Similarly, the five light receiving devices 1a–1e each are connected to one pole of the five switches 2f–2j, respectively, and are connected in parallel through these switches to the output terminal 4b, while they are connected to one pole of the five switches 2k–2o, respectively, and are connected in parallel through these switches to the output terminal 4c.

Further, the five light receiving units 1a–1e each are connected to one pole of the five switches 2p–2t, respectively, and are connected in parallel through these switches to a charge draining terminal 5. The charge draining terminal 5 is connected to a photoscreen 6 formed as a dummy light receiving portion around the light receiving section 1 inside the chip and drains the charge photoelectrically converted into in the other region than the light receiving section 1 and absorbed by the photoscreen 6 to the outside of chip. The charge draining terminal 5 is set at the same potential as a reading voltage set for the output section 4 by a potential source outside the chip.

The 20-stage nodes constituting the shift register 11 include output terminals, each being connected to the other pole of the twenty switches 2a–2t, and data input terminal 10a and clock input terminal 10b connected to the outside. Here, in the shift register 11, a data signal indicating on or off is input together with a clock signal or in synchronization with a clock signal into each node at a specific position.

In FIG. 1, ON data is represented by "1" and OFF data by "0" in each node of shift register 11 receiving the data signal. Here, indications of "1" and "0" do not correspond to physical High state and Low state of data signal, but mean logic values of data signal.

The twenty switches 2a–2t constituting the switching section 2 are formed, for example, as MOS transistors. The sources or drains of these MOS transistors are connected to the five photodiodes 1a–1e or to the three output terminals 4a–4c and charge draining terminal 5. The fifteen switches 2a–2o each connected to the three output terminals 4a–4c are formed as MOS transistors for outputting signals and the five switches 2p–2t connected to the charge draining terminal 5 are formed as MOS transistors for draining the current.

The gates of the MOS transistors formed as twenty switches 2a–2t each are connected to the output terminals of the respective nodes in the shift register 11. This shift register 11 always supplies control signals of opposite polarities to the gate of a current draining MOS transistor and the gates of signal outputting MOS transistors, connected to a same photodiode. Namely, the current draining MOS transistor and signal outputting MOS transistors connected to a same photodiode are complementarily on/off-controlled.

In the photoelectric conversion apparatus as described, when image light from an object not shown is incident to the five photodiodes 1a–1e, these photodiodes 1a–1e each generate photocurrents depending upon the incident image light. Then the shift register 11 can select, for example, one of combinations of the five photodiodes 1a–1e and the three output terminals 4a–4c, and output the photocurrent of the photodiode thus selected to the outside of chip through the output terminal thus selected.

In other words, the shift register 11 turns on the signal outputting MOS transistor connected between the anode of the selected photodiode and the selected output terminal while turning off the photocurrent draining MOS transistor connected to the anode of the same photodiode. This causes the photocurrent according to the incident light to flow through the selected photodiode via the signal outputting MOS transistor turned on, out from the output terminal selected, thereby enabling to measure the quantity of incident light.

In such operation, the shift register 11 cuts off the signal outputting MOS transistors connected to the photodiodes not selected and turns on the current draining MOS transistors connected thereto. This drains the photocurrents flowing in the non-selected photodiodes through the current draining MOS transistors, thereby removing undesirable accumulated charges. In this manner, an arbitrary photodiode can be selected by a control signal from the control logic circuit 11 and the circuit can output a signal according to the photocurrent flowing in the photodiode selected.

For example, let us assume that data of on is input into each of the nodes of shift register 11 connected to the five switches 2a, 2g, 2h, 2o, 2s while data of off into each of the nodes of shift register 11 connected to the other switches. In this case, the five switches 2a, 2g, 2h, 2o, 2s become on and the other switches off.

Thus, the photoelectric conversion signal generated in the photodiode 1a is output through the switch 2a to the output terminal 4a. Further, photoelectric conversion signals generated in the two photodiodes 1b, 1c are output through the two switches 2g, 2h, respectively, to the output terminal 4b. Further, a photoelectric conversion signal generated in the photodiode 1e is output through the switch 2o to the output terminal 4c.

Here, the photocurrent generated in the photodiode 1d not selected by the shift register 11 is output through the switch 2s to the charge draining terminal 5. Namely, the circuit performs in synchronization draining the unnecessary charge of photodiode 1d to the outside of chip and extracting the signal charges of the other photodiodes to the outside of chip. Therefore, the unnecessary charge of photodiode 1d is prevented from becoming a dark current and in turn from negatively affecting the signal charges of the other photodiodes.

The anodes of the five photodiodes 1a–1e are always kept at the substrate potential, because they are always electrically connected to either the output section 4 or the charge draining terminal 5 by the current draining or signal outputting MOS transistors.

The shift register 11 may select an arbitrary number of photodiodes out of the five photodiodes 1a–1e and select an arbitrary number of output terminals out of the three output terminals 4a–4c. Or, the shift register 11 can select a specific combination of a photodiode and an output terminal.

Accordingly, an arbitrary switch in the switching section 2 can be opened or closed independently by properly inputting the data of on or off into each node of shift register 11 in order to accurately output a photocurrent of a photodiode necessary for measurement of light exposure out of the photodiodes formed in a desired light receiving region in the chip. Consequently, a photocurrent of an arbitrary photodiode in the light receiving section 1 can be output to an arbitrary output terminal in the output section 4.

As described, the present embodiment enables us to selectively measure the light quantity at an arbitrary place on the light receiving surface by such simple device structure that the 15-stage shift register controls the fifteen switches connecting the photodiodes with the output terminals in the all combinations of the five photodiodes 1a–1e and the three output terminals 4a–4c.

The present embodiment showed just an example as to the number of photodiodes in the light receiving section 1, the number of switches in the switching section 2, the number of output terminals in the output section 4, and the data input to the respective stages of the shift register 11, but the invention is not limited to these. Further, the arrangement of the photodiodes in the light receiving section 1 is also arbitrary, and they may be arranged not only on a line, but also in a matrix.

In summary, the present embodiment is so arranged that the (m×n) switches are set between the all combinations of the m photodiodes in the light receiving section and the n output terminals in the output section and that the (m×n) switches are switched by the (m×n)-stage nodes in the shift register. Since this arrangement permits an arbitrary switch to be opened or closed independently, a photocurrent generated in an arbitrary photodiode can be selected to be output to an arbitrary output terminal.

Second Embodiment

Figure 2:
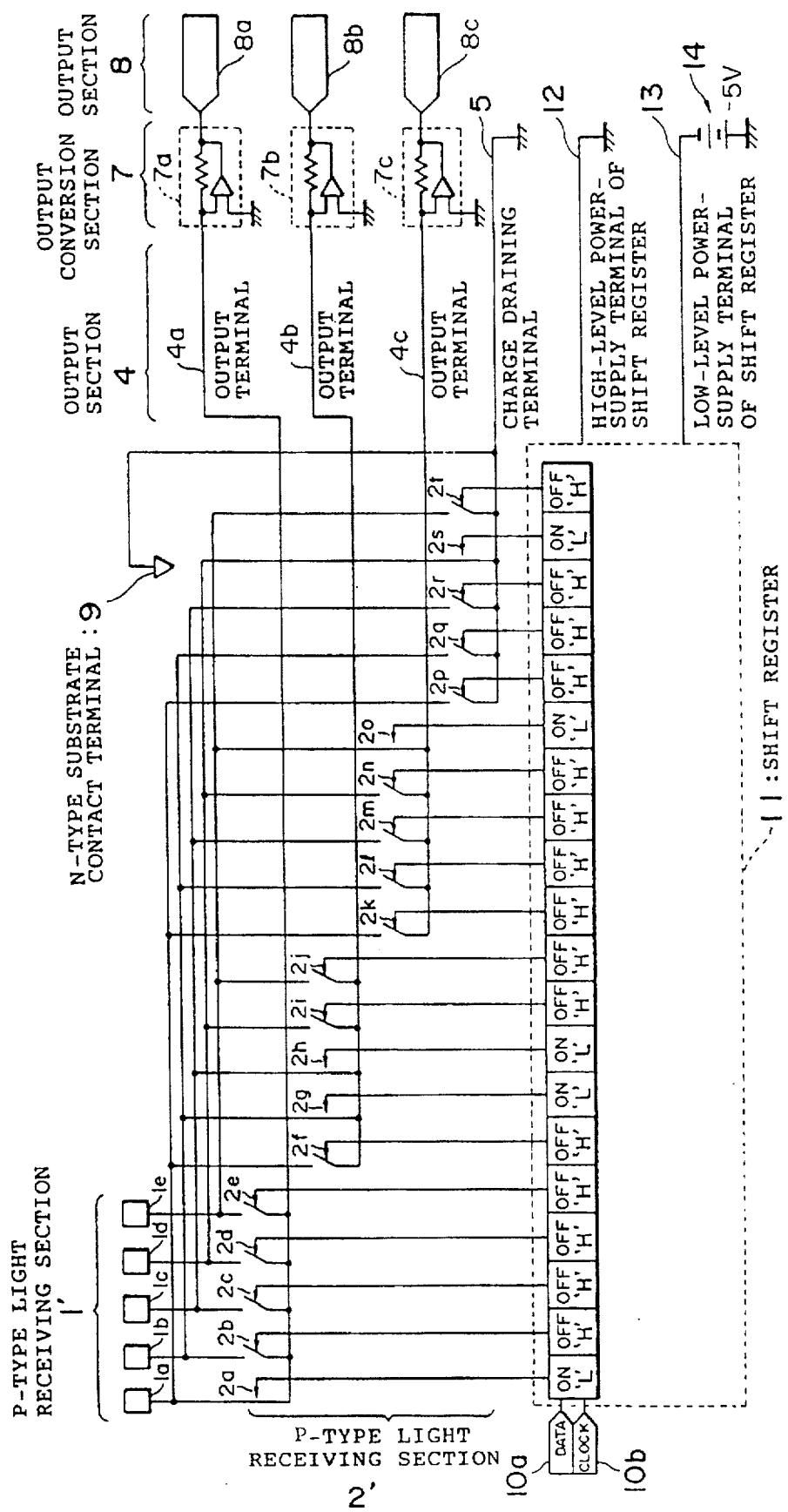
FIG. 2 is a block diagram to show the structure of the second embodiment associated with the photosensor circuit of the present invention.

As shown in FIG. 2, the photosensor circuit of the present embodiment is a modification of the above first embodiment and has the light receiving section 1', switching section 2', output section 4, and shift register 11 formed almost in the same manner as in the above first embodiment. In this photosensor circuit, the light receiving section 1' having p-type light receiving regions and the switching section 2' constructed of p-type MOS transistors are formed on an n-type semiconductor substrate.

The output section 4 is connected to an output section 8 through an output conversion section 7 disposed inside or outside the chip. Namely, the three output terminals 4a–4c constituting the output section 4 are connected through three current-voltage conversion circuits 7a–7c constituting the output conversion section 7 to three voltage conversion output terminals 8a–8c constituting the output section 8.

Here, each of the three current-voltage conversion circuits 7a–7c is composed of a resistance component, an impedance component, or a transistor circuit. Thus, the three output terminals 4a–4c are set each at the potential 0 V, based on input imaginary short of the three current-voltage conversion circuits 7a–7c.

The charge draining terminal 5 is connected to the substrate potential source of the chip through a substrate contact terminal 9. The ground potential GND (0 V) is made as this substrate potential source of chip by connecting the charge draining terminal 5 to the earth. Because of this, the wiring for connecting the substrate contact terminal 3 with the cathodes of the five photodiodes 1a–1e and the wiring for connecting the substrate contact terminal 9 with the charge draining terminal 5 are ground wires as substrate potential lines.

Further, the anodes of the five photodiodes 1a–1e are always kept at the substrate potential, because they are always electrically connected to either the output section 4 or the charge draining terminal 5 by the current draining or signal outputting p-type MOS transistors. Further, the cathodes of the five photodiodes 1a–1e are always kept at the substrate potential, because they are connected through the substrate contact terminal 3 to the substrate potential source.

Therefore, the pn junctions of the light receiving section 1' and switching section 2' are in a bias state of zero volt relative to the n-type semiconductor substrate, whereby dark currents due to reverse bias of pn junction can be eliminated surely. This can prevent such negative effect that a large current flowing due to the dark current causes noise to go into the circuit including the signal wiring.

Further, the shift register 11 has a high-potential power-supply terminal 12 set at the ground potential GND by earthing it and a low-potential power-supply terminal 13 set at the potential of about −5 V by connecting it to a power supply 14. This keeps the signal levels of input from the shift register 11 to the switching section 2' at 0 V in the High state or at −5 V in the Low state. When the signal levels supplied from the shift register 11 are in the High state and in the Low state, the p-type MOS transistors in the switching section 2' are OFF and ON, respectively.

Figure 3:
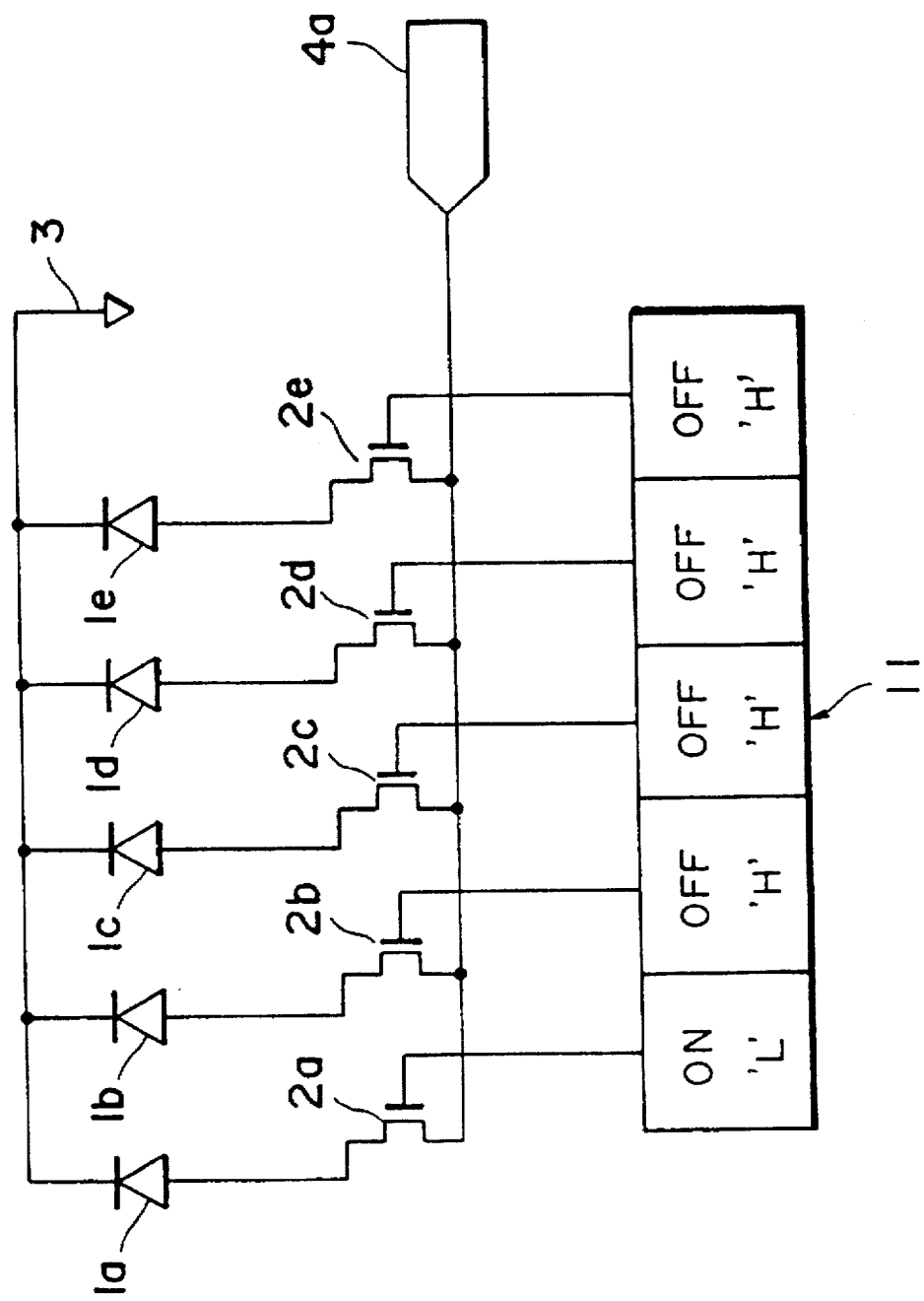
FIG. 3 is a block diagram to show the structure of light receiving section and switching section in the photosensor circuit of FIG. 2.

The twenty switches 2a–2t constituting the switching section 2' each are formed, for example, as p-type MOS transistors. In FIG. 3, for convenience of explanation, here are representative elements extracted from the photosensor circuit, including only the five photodiodes 1a–1e connected to the five switches 2a–2e, the output terminal 4a, and the 5-stage nodes in the shift register 11.

The sources of these p-type MOS transistors each are connected to the anodes of the five photodiodes 1a–1e. The drains of these p-type MOS transistors each are connected to the three output terminals 4a–4c and the charge draining terminal 5. Here, the cathodes of the five photodiodes 1a–1e are connected through the substrate contact terminal 3 to the substrate potential source of chip in common.

The fifteen switches 2a–2o each connected to the three output terminals 4a–4c are formed as p-type MOS transistors for outputting the signal. The five switches 2p–2t connected to the charge draining terminal 5 are formed as p-type MOS transistors for draining the current.

The gate of each of the p-type MOS transistors formed as twenty switches 2a–2t is connected to the output terminal of each node in the shift register 11. This shift register 11 always supplies control signals of opposite polarities to the gate of a current draining p-type MOS transistor and to the gates of signal outputting p-type MOS transistors, connected to a same photodiode. Namely, the current draining p-type MOS transistor and signal outputting p-type MOS transistors connected to a same photodiode are complementarily on/off-controlled.

In FIG. 2, where the twenty switches 2a–2t are the p-type MOS transistors, the ON data is indicated by "Low" and the OFF data by "High" in each node of shift register 11 receiving the data signal. Here, the indications of "High" and "Low" correspond to the physical High state and Low state of data signal.

Figure 4:
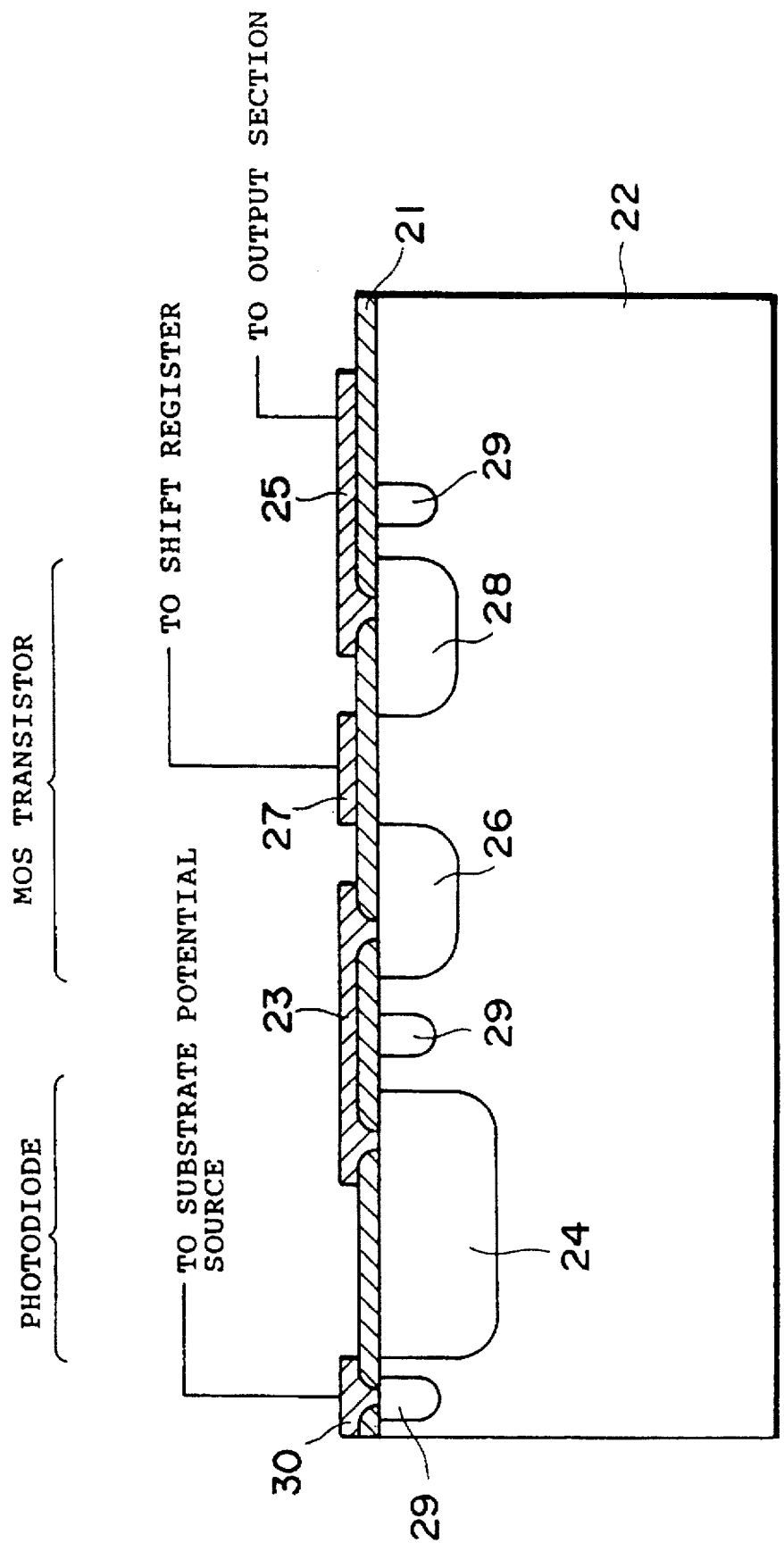
FIG. 4 is a sectional view to show a photodiode in the light receiving section of FIG. 3 and an MOS transistor in the switching section.

In FIG. 4, there is partially shown a specific device structure including a photodiode in the light receiving section 1' and a signal outputting MOS transistor in the switching section 2'. As shown in FIG. 4, a p-type diffusion region 24 for forming the photodiode is formed on an n-type semiconductor substrate 22. A p-type source diffusion region 26 and a p-type drain diffusion region 28 are formed on the n-type semiconductor substrate 22 in order to form the p-type MOS transistor as a signal outputting MOS transistor.

Here, a channel cut region 29 by n-type diffusion is formed between the region of light receiving section and the region of switching section to separate the elements from each other. Since the actual photosensor circuit incorporates, for example as shown in FIG. 2, the five p-type diffusion regions 24 and twenty p-type MOS transistors, these channel cut regions 29 are formed so as to separate the elements one from another.

An insulating layer 21 is formed over the surface of the n-type semiconductor substrate 22 and has contact apertures in the electrode or wiring forming regions above the diffusion regions of various conduction types. Aluminum wiring 23 connects the p-type diffusion region 24 of phototransistor to the source diffusion region 26 of the p-type MOS transistor, and aluminum wiring 25 connects the drain diffusion region 28 of p-type MOS transistor to the output section 4.

Further, an electrically conductive layer 27 is formed as a gate electrode of the p-type MOS transistor between the p-type source diffusion region 26 and the p-type drain diffusion region 28 on the n-type semiconductor substrate 22 and is connected to the output terminal of node in the shift register 11. A wiring layer 30 connects the channel cut region 29 with the substrate contact terminal 3.

Here, it is needless to mention that the configuration and location of the p-type diffusion region 24 forming the light receiving region can be arbitrarily selected depending upon usage purpose of photoelectric conversion apparatus. Although FIG. 4 shows that only the signal outputting p-type MOS transistor is connected to the p-type diffusion region 24, the photocurrent draining p-type MOS transistor is also connected to the p-type diffusion region 24 in the actual circuit. The photocurrent draining p-type MOS transistor can be constructed in the same structure as the signal outputting p-type MOS transistor shown in FIG. 4.

In the device structure of FIG. 4, a bias would be given, if it were conventional one, between the n-type semiconductor substrate 22 and, the p-type diffusion region 24 of photodiode and the source/drain diffusion regions 26, 28 of p-type MOS transistor so that the potential on the side of the n-type semiconductor substrate 22 is higer than that on the other side. However, the present embodiment is so arranged that the potential of the p-type diffusion region 24 of photodiode and the source/drain diffusion regions 26, 28 of p-type MOS transistor is kept equal to the potential of the n-type semiconductor substrate 22 to decrease the leak current flowing from the n-type semiconductor substrate 22 to the p-type diffusion region 24 of photodiode and the source/drain diffusion regions 26, 28 of MOS transistor, i.e., to decrease the dark current.

Actually, the potential of the n-type semiconductor substrate 22, light-receiving diffusion region 24, source diffusion region 26 and drain diffusion region 28, output section 4, and charge draining terminal 5 is set at the ground potential, i.e., at 0 V. Further, the potential of p-well diffusion regions forming the shift register 11 constructed of the CMOS circuits, which is the potential on the low level power supply side, is set to −5 V, and the substrate potential on the high level power supply side to 0 V, so that the levels of control logic signals are −5 V and 0 V.

This makes the output potential of photoelectric conversion apparatus be 0 V and facilitates processing of signal currents after output. In addition to the above potential setting, it is of course possible to employ another potential arrangement if the bias voltage is nearly 0 V for the pn junctions between the diffusion region 24 of light receiving section and the semiconductor substrate 22, etc., as described above.

Accordingly, the present embodiment enables to realize the integrated circuit apparatus with high reliability as a photosensor circuit for accurately performing measurement of light quantity as preventing occurrence of dark current in the pn junctions inside the chip and being free of the influence of dark current even in the regions of very weak light, by such simple circuit structure as to connect the power-supply wiring and ground wiring of shift register 11 and the wiring of the light receiving section 1' and output section 4 to the outside of chip through separate pins without connecting them inside the chip.

Third Embodiment

Figure 5:
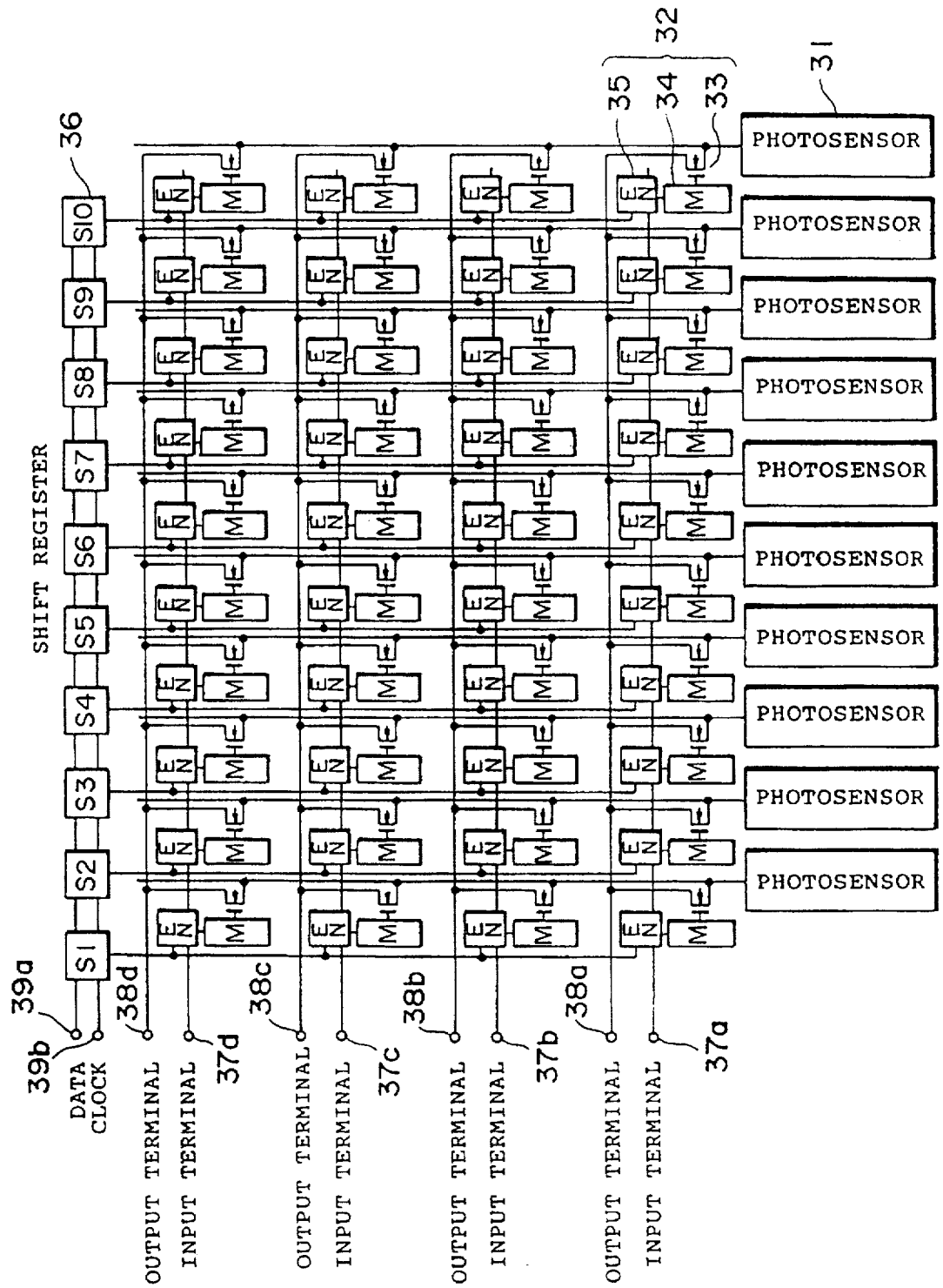
FIG. 5 is a block diagram to show the structure of the third embodiment associated with the photosensor circuit of the present invention.

As shown in FIG. 5, the photosensor circuit of the present embodiment has a light receiving section 31 consisting of ten photosensors disposed to face the detected object, and four output terminals 38a–38d connected to the outside of chip. In addition, this photosensor circuit further has a switching section 32 consisting of forty switches, and a shift register 36 consisting of 10-stage nodes continuously connected as a dynamic control logic circuit.

The output of each photosensor in the light receiving section 31 is connected in parallel through switches 33 comprised of NMOS transistors forming four switching elements 32 with the four output terminals 38a–38d. Since the gate of each switch 33 is connected to a static memory 34, an output from each photosensor can be output to an arbitrary output terminal by rewriting the contents of memory 34 to control on/off of the switch 33.

The shift register 36 consisting of the 10-stage nodes is provided as a dynamic control logic circuit to write data into the individual memories 34 and has a data input terminal 39a and a clock input terminal 39b connected to the outside of chip, for taking the data signal into each node in synchronization with the clock signal. These 10-stage nodes store respective data of whether the ten photosensors constituting the light receiving section 31 are to be turned on or off.

The data in the shift register 36 is output as sequentially shifting the output by clock signals and is written through an enable circuit (EN) 35 into each memory 34 in the switching element 32. This EN 35 is mounted to each of the memories 34 making the forty switching elements 32. Each group of ENs 35 for operating the switches 33 connected in parallel to the four output terminals 38a–38d are controlled by respective signals input through the four input terminals 37a–37d.

In more detail, for example, when the contents of data stored in the 10-stage nodes constituting the shift register 36 are written in the memories 34 of the ten switching elements 32 disposed closest to the photosensors in the light receiving section 31, the signal of $V_H$ is sent through the input terminal 37a to the ten ENs 35 disposed on a same line to enable write and the signal of $V_L$ is sent through the three input terminals 37b–37d to the ten ENs 35 on each of the lines different from each other to disable write.

Similarly, when the signal of $V_H$ is sent in order through the three input terminals 37b–37d to the ten ENs 35 disposed on each of the lines different from each other, the contents of output data from the shift register 36 can be written in the memories 33 arranged in that line. This permits the on/off control of the switches 33 in each line, based on the output data from the shift register 36, so that a signal generated in an arbitrary photosensor in the light receiving section 31 can be output through an arbitrary output terminal.

The present embodiment can output the outputs from the ten photosensors constituting the light receiving section 31 in an arbitrary combination to the four output terminals 38a–38d. Further, the shift register 36 used is the dynamic one simpler in structure than the static one, which can decrease the chip area. By using the switching elements 32, each composed of a switch 33, a memory 34, and an EN 35, the number of stages in the shift register against the number of photosensors can be decreased as compared with those in the above first and second embodiments.

It is noted that just an example was introduced herein as to the numbers of the photosensors and output terminals, but the invention is not limited to this example. Therefore, in accordance with the numbers thereof, the numbers or arrangement of switches 33, memories 34, ENs 35, shift register 36, and input terminals may be changed. Further, the circuit for controlling write into the memory 34 is not limited to the EN 35, but may be another circuit.

The photosensor circuit of the present embodiment as described above is so arranged that, for writing data of shift register 36 in the memories 34, the data is written into only desired memories 34 by the circuits for controlling write, thereby turning on or off the switches 33 through the memories 34. Accordingly, since the outputs from the photosensors are arranged to be output to the desired output terminals, outputs from many photosensors can be output in an arbitrary combination to many output terminals.

As a result, detection can be made using the photosensors located at appropriate positions in accordance with the configuration of the detected object. This makes it unnecessary to perform such adjusting operation as positioning upon exchange of sensor chips, thus getting easily ready for manufacture of many kinds but small quantities.

Fourth Embodiment

Figure 6:
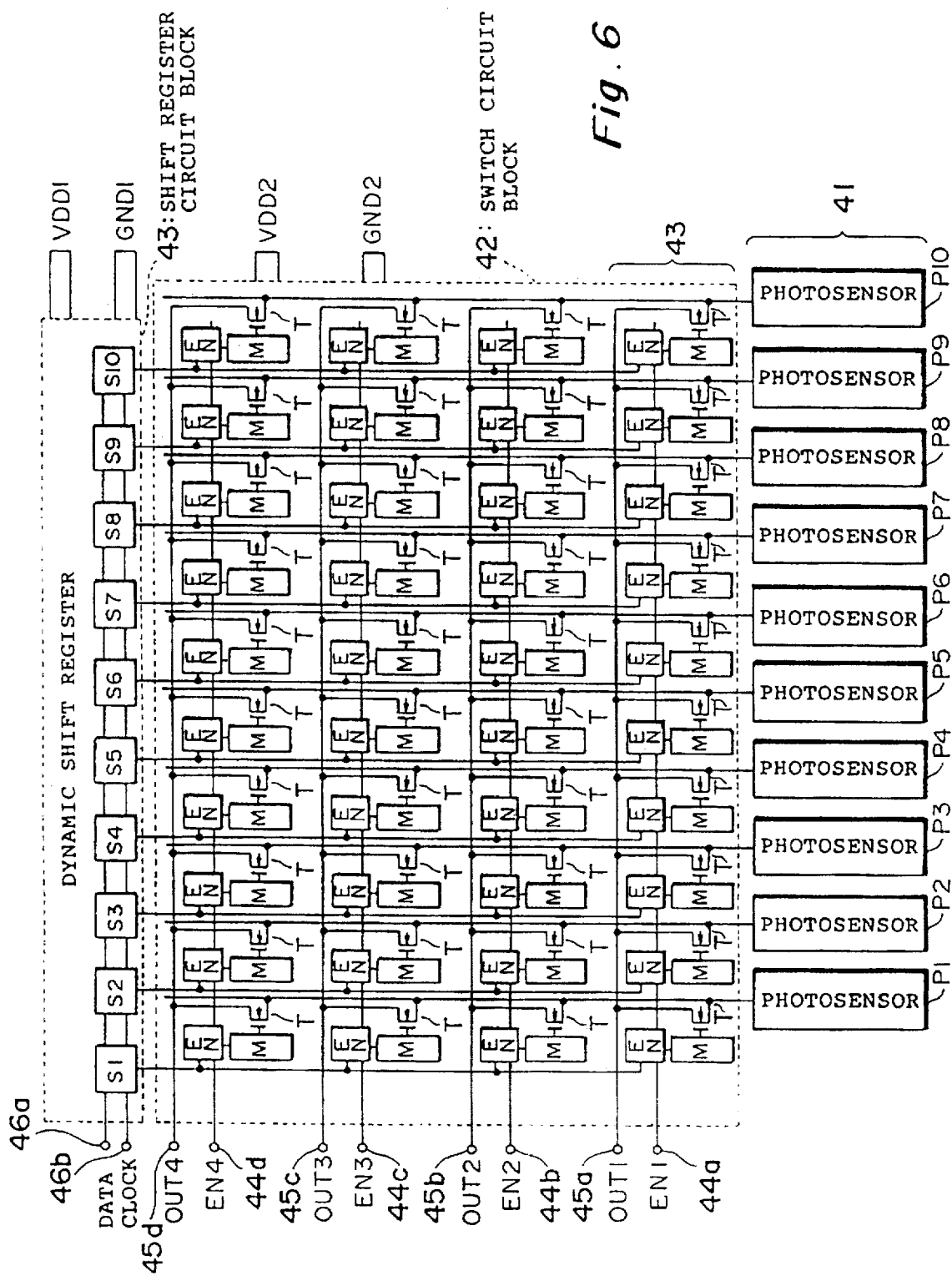
FIG. 6 is a block diagram to show the structure of the fourth embodiment associated with the photosensor circuit of the present invention.

As shown in FIG. 6, the photosensor circuit of the present embodiment is an integrated circuit apparatus, which is provided with a switch circuit block 42 as an integrated circuit other than the dynamic shift register and photosensors, disposed between a shift register circuit block 43 including a dynamic shift register and a light receiving section 41 including ten photosensors P1–P10.

The dynamic shift register of the shift register circuit block 43 includes ten circuit stages S1–S10 continuously connected. The data and clock signals are supplied through the data input terminal 46a and clock input terminal 46b connected to the outside of chip, to this first circuit stage S1.

The switch circuit block 42 is provided with forty switch circuits 43 arranged in a matrix of 4 rows×10 columns. Each switch circuit 43 is composed of an enable circuit EN connected to the output of an associated circuit stage of the dynamic shift register, an NMOS transistor T connected to an associated photosensor in the light receiving section 41, and a memory circuit M, for example, of one bit for controlling on/off of the NMOS transistor T.

The enable circuit EN receives the output from the circuit stage in the dynamic shift register associated with the column of the switch circuit 43 in question and either one of enable signals EN1–EN4 from the four input terminals 44a–44d connected to the outside of chip. Then the output from the enable circuit EN is supplied to the memory circuit M, whereby in accordance with one logic state of the enable signal EN1–EN4 the data of the associated circuit stage in the dynamic shift register can be written in the memory circuit M. If no data is written in a memory circuit M, that memory M retains the previous data.

In each NMOS transistor T, the gate electrode is controlled by the output from the memory circuit M in the switch circuit 43, the drain electrode is connected to either one of the four output terminals 45a–45d corresponding to the row of the switch circuit 43, and the source electrode is connected to either one of the ten photosensors P1–P10 corresponding to the column of the switch circuit 43 in question.

As detailed later, the power-supply wiring VDD1 and ground wiring GND1 of the shift register circuit block 43 and the power-supply wiring VDD2 and ground wiring GND2 of the switch circuit block 42 are separated one from another to be connected to the outside of the integrated circuit apparatus.

Briefly speaking, this photosensor circuit outputs the outputs from the ten photosensors P1–P10 to the four output terminals 45a–45d in an arbitrary combination. Thus, the output of each of these photosensors P1–P10 is connected in common to the source electrodes of NMOS transistors T numbering four, which is the same as the number of output terminals. An output from an arbitrary photosensor can be output as output signal OUT1–OUT4 to an arbitrary output pad by rewriting the contents of the memory circuits M connected to the gate electrodes of NMOS transistors T and thereby controlling on/off of the switches comprised of the NMOS transistors T.

The dynamic shift register is used to write data in each memory circuit M. The data and clock signals are supplied to the dynamic shift register so as to effect predetermined shift operation, thereby setting the data contents in the ten circuit stages in the dynamic shift register.

After that, for example, when it is desired to write the contents of the register into the memory circuit group arranged in the same row closest to the ten photosensors, that is, into the memory circuit group for controlling the switches for outputting the output signals from the respective photosensors to the output terminal 45a, only the enable signal EN1 is set in the write enable state, for example, at the High voltage VH while the other enable signals EN2–EN4 in the write disable state, for example, at the Low voltage VL.

Similarly, if only the enable signal EN2 is set in the write enable state while the other enable signals EN1, EN3, EN4 in the write disable state, data can be written into the memory circuit group for controlling the switches for outputting the output signals from the respective photosensors to the output terminal 45b. As described, the data necessary for the all memory circuits can be written by writing data into the memory circuit group in each line.

Here, the shift register circuit block 43 including the dynamic shift register and the switch circuit block 42 including the switch circuits two-dimensionally arranged both are digital circuits. The present embodiment does not employ the arrangement in which the power-supply wiring lines or the like of the two circuit blocks 42, 43 are connected inside the chip to obtain an output through a common pin in order to decrease the number of input/output pins as in the conventional integrated circuit apparatus.

In contrast, the present embodiment is so arranged that the power-supply wiring VDD1 and ground wiring GND1 of the shift register circuit block 43 and the power-supply wiring VDD2 and ground wiring GND2 of the switch circuit block 42 are not connected inside the chip, but are connected through separate pins to the outside of chip. The ground wiring lines GND1, GND2 of the two circuit blocks 45, 43 are similar to the power-supply wiring lines, but they may be power-supply lines of different voltages.

The photosensor circuit as described does not always necessitate the refresh operation of the dynamic shift register in the shift register circuit block 43. This is because, even if a large current due to the dark current flows between the power-supply wiring and the ground wiring of the dynamic shift register because of omission of the refresh operation of the dynamic shift register, this large current causes no negative effect such as an increase in the ground potential of another circuit block, for example, of the switch circuit block 42.

Figure 7:
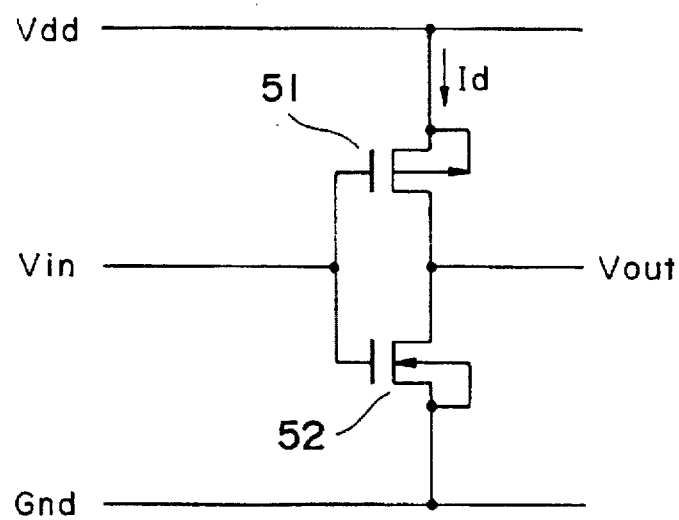
FIG. 7 is a circuit diagram to show the structure of CMOS inverter in the shift register of the photosensor circuit of FIG. 6.

The dark current occurring from the dynamic shift register is next explained in detail. As shown in FIG. 7, the dynamic shift register is constructed, for example, of a number of CMOS inverters continuously connected. This CMOS inverter is so arranged that PMOS transistor 51 and NMOS transistor 52 are connected in series between positive power-supply voltage Vdd and ground voltage Gnd, for example.

Namely, the gate of PMOS transistor 51 and the gate of NMOS transistor 52 are connected in common to compose an input node to which an input voltage Vin is applied. Further, the drain of PMOS transistor 51 and the drain of NMOS transistor 52 are connected in common to compose an output node from which an output voltage Vout is taken out.

If the dynamic shift register using a lot of such CMOS inverters is let to stand under the power supply condition and without performing the refresh operation, it comes to saturate due to the dark current. Each node in the circuits of the dynamic shift register takes a potential between the ground voltage Gnd, being the minimum potential in the chip, and the power-supply voltage Vdd, being the maximum potential. There are some cases in which some of many nodes take intermediate potentials between the minimum potential and the maximum potential as saturating due to the dark current. In such cases, a large current flows in the inverters the input nodes of which are the nodes of the intermediate potentials.

Figure 8:
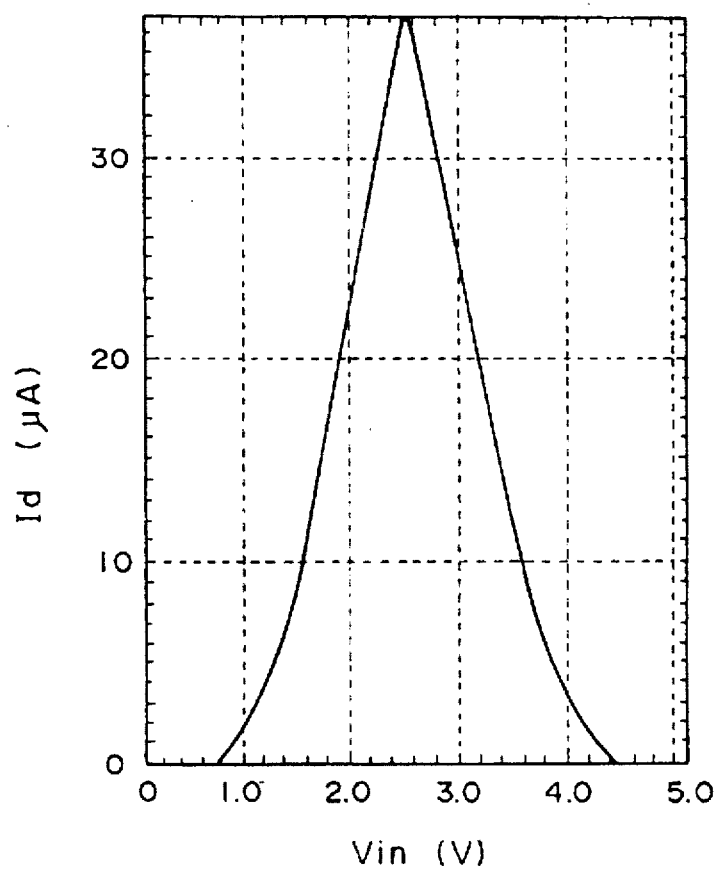
FIG. 8 is a graph to show the relation between power-supply current and input voltage in the CMOS inverter of FIG. 7.

More specifically, FIG. 8 shows the relation between input voltage Vin and power-supply current Id of CMOS inverter. As apparent from FIG. 8, little power-supply current Id flows when the input voltage Vin is near the minimum potential or near the maximum potential; whereas, a large power-supply current Id flows when the input voltage Vin is near the middle potential.

When the dynamic shift register saturates due to the dark current, the changing speed of the potential of node is slow, and the period for the node to reside near the middle potential is also relatively long. This means that a large power-supply current flows throughout a considerable period of time. For example, in the case of the integrated circuit apparatus, there is a restriction on the area of each wiring, and therefore, the power-supply wiring is also restricted within some width and has a relatively large resistance. Thus, as long as the power-supply current is small, the voltage drop expressed by V (voltage)=R (resistance)×I (current) can be ignored; but this voltage drop becomes unignorable if the power-supply current becomes large.

Here, the present embodiment is so arranged that the power-supply wiring lines and the ground wiring lines of the shift register circuit block 43 and switch circuit block 42 are not connected inside the chip, but are connected through separate pins to the outside of chip, which can prevent change in the reference potential in correspondence to the magnitude of the power-supply current. This makes it possible to prevent the negative effect on the other circuit elements connected to the power-supply wiring in the same chip.

Figure 9:
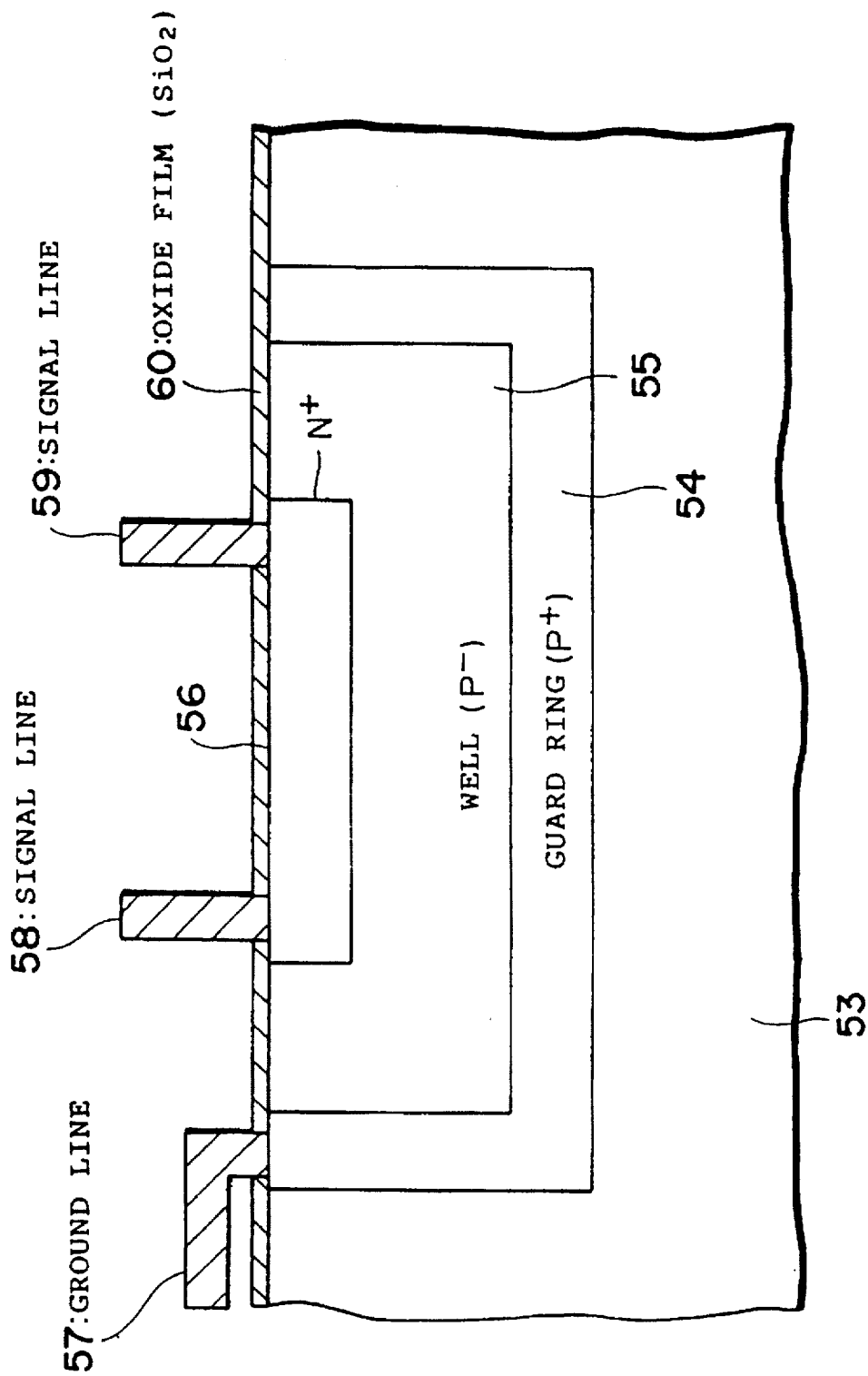
FIG. 9 is a sectional view to show the structure of crossunder in the photosensor circuit of FIG. 6.

More specifically, when the structure called as crossunder is employed in order to achieve intersection of wires in the integrated circuit apparatus, as shown in FIG. 9, for example, a P+ type semiconductor region 54 is formed as a guard ring on the semiconductor substrate 53 forming the chip, a P– type well 55 with a rather low impurity concentration is formed inside this guard ring 54, and an N+ type signal wiring region 56 is formed further inside the P– type well 55.

The guard ring 54 is connected to ground wiring 57 as being an aluminum line, and the signal wiring region 56 is connected to signal wires 58, 59 and the like. as being aluminum lines. The other regions than the wiring portions on the semiconductor substrate 53 are covered by an oxide film 60, for example, made of silicon dioxide ($SiO_2$).

In this structure, the PN junction between the N+ type signal wiring region 56 and, the P– type well 55 and the P+ type guard ring 54 connected to the ground wiring 57, is in the reverse bias condition, and the signal wiring 58 is connected to the N+ type signal wiring region 56 formed below the oxide film 60, which permits intersection of another unrepresented signal wiring formed on the oxide film 60, for example.

Here, the present embodiment is so arranged that the power-supply wiring and ground wiring lines of the shift register circuit block 43 and switch circuit block 42 are not connected inside the chip, but are connected through separate pins to the outside of chip, whereby a large current is prevented from flowing to the ground wiring 57 giving the potential of the guard ring 54 in the crossunder structure, thereby preventing the potential of the guard ring 54 from increasing because of the resistance.

If the increase of the potential of guard ring 54 were great, the PN junction between the P– well 55 and the N+ wiring region 56 turns into the forward bias condition, causing the current to flow from the ground wiring 57 into the signal lines 58, 59. For example, when the N+ type signal line region 56 is at 0 V and when the potential increase of the guard ring 54 reaches approximately 0.6 V, the PN junction turns into the forward bias condition. In other words, a large current flowing to the ground wiring causes the current to flow into the signal lines.

Accordingly, the present embodiment enables to realize the integrated circuit apparatus with high reliability as a photosensor circuit, which can prevent an increase of waste current consumption, which could be caused by always performing the refresh operation for the dynamic shift register, by such simple circuit structure that the power-supply wiring and ground wiring lines of the two circuit blocks are connected through different pins to the outside of chip.

Fifth Embodiment

Figure 10:
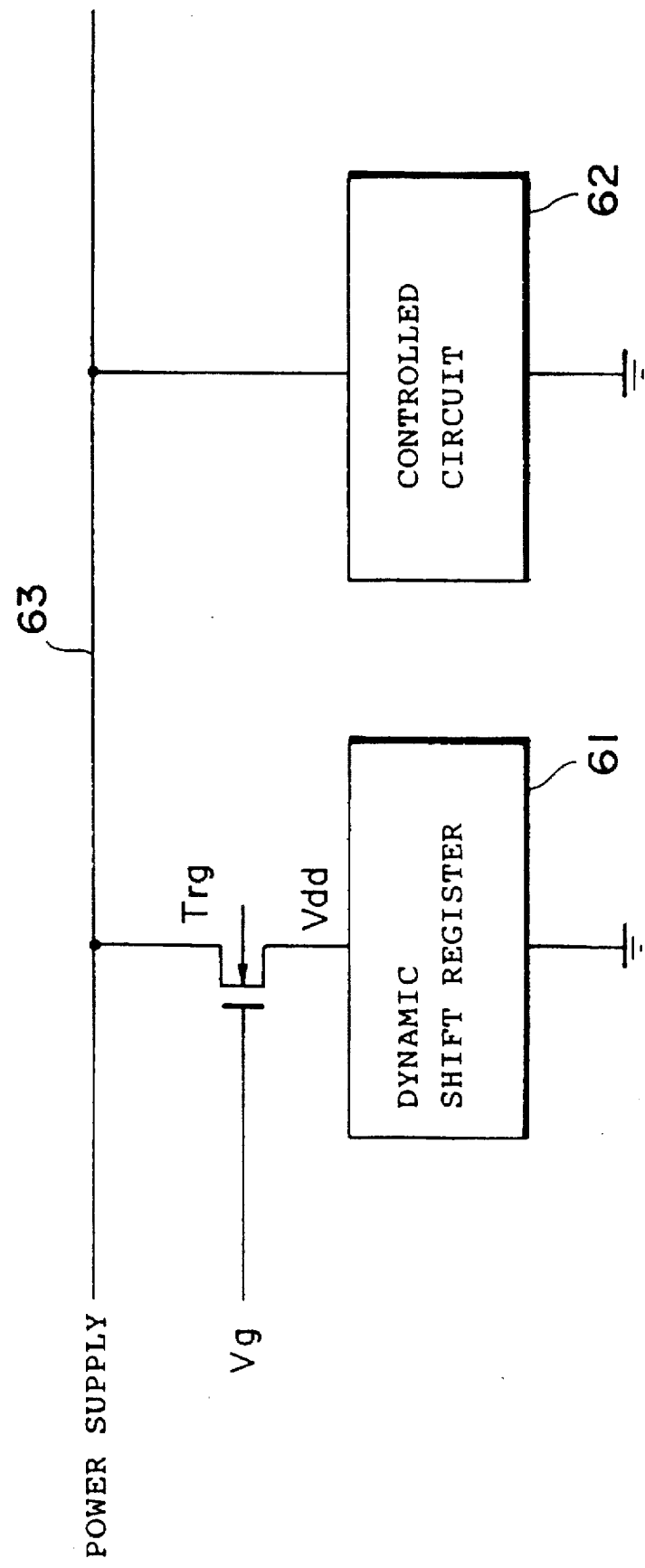
FIG. 10 is a block diagram to show the structure of the fifth embodiment associated with the photosensor circuit of the present invention.

As shown in FIG. 10, the photosensor circuit of the present embodiment is a modification of the above third embodiment, which has a dynamic shift register 61 constructed as a control logic circuit, and a controlled circuit 62 comprised of the light receiving section and the switching section other than the dynamic shift register. The dynamic shift register 61 is connected through a drain-to-source circuit of MOS transistor Trg as a switch element to a power-supply line 63.

A control signal Vg is supplied to the gate of the transistor Trg, and the power-supply voltage is supplied through the transistor Trg to the dynamic shift register 61. Further, the power-supply voltage is directly supplied through the power-supply line 63 to the controlled circuit 62. In order to equalize the power-supply voltage supplied to the controlled circuit 63 with the power-supply voltage Vdd supplied to the dynamic shift register 61, an MOS transistor always kept on may be connected between the controlled circuit 62 and the power-supply line 63.

In this photosensor circuit, because the supply of the power-supply current to the dynamic shift register 61 is effected through the transistor Trg, the dynamic shift register 61 can perform the normal operation as long as the transistor Trg is kept on, that is, as long as the control voltage Vg is kept at the voltage of the logic High. In contrast with it, if the transistor Trg is turned off, i.e., if the control voltage Vg is changed to the voltage of the logic Low, and if the nodes in the dynamic shift register 61 saturate due to the dark current, no current will be supplied because it is shut off from the power supply, thus preventing the large current from flowing to the controlled circuit 62.

Here, since the controlled circuit 62 includes memories for write or read of data of outputs from the respective nodes in the dynamic shift register 61, the control voltage Vg may be arranged to be a signal which turns to the voltage of the logic Low when write or read of data is not carried out. Namely, the control voltage Vg may be a signal for cutting off the transistor Trg when the dynamic shift register 61 does not need to operate.

The arrangement for supplying the power through the transistor Trg as a switching element may be applied to only some circuit stages or units in the dynamic shift register 61. In this case, the current based on saturation due to the dark current cannot be decreased to zero, but can be greatly decreased.

Since the photosensor circuit of this arrangement interrupts the power supplied to the dynamic shift register through the switch element when the dynamic shift register 61 does not need to operate, no large current flows to the power-supply wiring even with saturation of the dynamic shift register 61 due to the dark current and even without always performing the refresh operation of the dynamic shift register 61.

Accordingly, the present embodiment enables to realize the integrated circuit apparatus with high reliability as a photosensor circuit, which can prevent an increase of waste current consumption, which could be caused by always performing the refresh operation of the dynamic shift register, by such simple circuit structure that the switch element interrupts the power supplied to the dynamic shift register.

Sixth Embodiment

Figure 11:
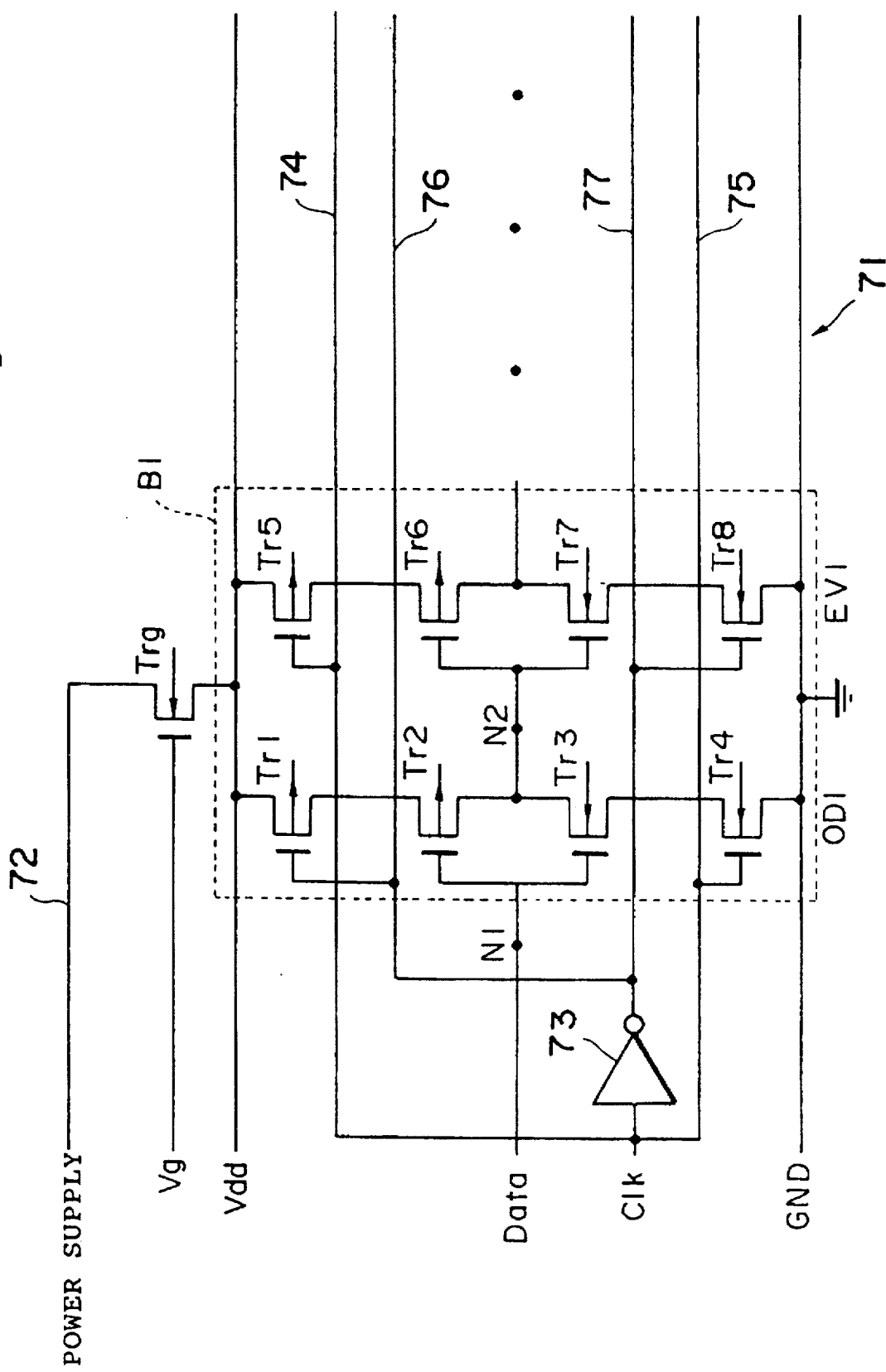
FIG. 11 is a block diagram to show the structure of the sixth embodiment associated with the photosensor circuit of the present invention.

As shown in FIG. 11, the photosensor circuit of the present embodiment is a modification of the above third embodiment, which uses a dynamic shift register 71 called as CCMOS. In FIG. 11, only circuit portions related to the dynamic shift register are illustrated as extracted from the integrated circuit apparatus. The drawing shows only the circuit stage B1 of the first bit out of circuit stages in the dynamic shift register 71 composed of the circuit stages for plural bits, continuously connected.

This circuit stage B1 is composed of odd stage unit OD1 and even stage unit EV1 continuously connected. The odd stage unit OD1 has four MOS transistors Tr1, Tr2, Tr3, Tr4 having a current route connected in series between the internal power supply Vdd of shift transistor 71 and the ground GND. Further, the even stage unit EV1 has four transistors Tr5, Tr6, Tr7, Tr8 having a current route connected in series between the internal power supply Vdd and the ground GND.

In the odd stage unit OD1 the two transistors Tr1, Tr2 are PMOS transistors. The source of the transistor Tr1 is connected to the internal power supply Vdd and the drain of the transistor Tr1 to the source of the transistor Tr2. The two transistors Tr3, Tr4 are NMOS transistors. The drain of the transistor Tr3 is connected to the drain of the transistor Tr2 and the source of the transistor Tr3 to the drain of the transistor Tr4. The source of the transistor Tr4 is connected to the ground GND.

In the even stage unit EV1 the two transistors Tr5, Tr6 are PMOS transistors. The source of the transistor. Tr5 is connected to the internal power supply Vdd and the drain of the transistor Tr5 to the source of the transistor Tr6. The two transistors Tr7, Tr8 are NMOS transistors. The drain of the transistor Tr7 is connected to the drain of the transistor Tr6 and the source of the transistor Tr7 to the drain of the transistor Tr8. The source of the transistor Tr8 is connected to the ground GND.

Further, the gates of the two transistor Tr2 and transistor Tr3 are connected in common to the data input terminal Data. The gates of the two transistor Tr6 and transistor Tr7 are connected in common to the drains of the two transistors Tr2, Tr3 connected in common. The drains of the two transistors Tr6, Tr7 connected in common become an output to the next bit circuit stage. The two transistors Tr2, Tr3 of the odd stage unit OD1 and the two transistors Tr6, Tr7 of the even stage unit EV1 each compose CMOS inverters.

An inverter 73 is set for the circuit stage B1 of the dynamic shift register 71. The input of the inverter 73 is connected to a clock input terminal Clk to receive the clock signal for shift operation. The clock input terminal Clk is connected to two clock signal lines 74, 75 provided along the respective circuit stages of shift register. The output of the inverter 73 is connected to two inverted clock signal lines 76, 77 provided along the respective circuit stages of shift register 71.

Connected to the two clock lines 74, 75 are the gate of the transistor Tr5 in the even stage unit EV1 and the gate of the transistor Tr4 in the odd stage unit OD1, respectively. Further, connected to the two inverted clock signal lines 76, 77 are the gate of the transistor Tr1 in the odd stage unit OD1 and the gate of the transistor Tr8 in the even stage unit EV1.

The circuit stages of the respective bits not shown are also constructed in the same structure as the first bit circuit stage B1 and are connected each to the two clock signal lines 74, 75 and the two inverted clock signal lines 76, 77 by well known means.

Here, the internal power-supply line Vdd of the shift register 71 is connected to the power-supply line 72 through the drain-to-source circuit of NMOS transistor Trg as a switch element, similarly as in the above fifth embodiment. Namely, the control voltage Vg is supplied to the gate of the transistor Trg and the power-supply voltage is supplied through the transistor Trg to the dynamic shift register 71.

The dynamic shift register 71, while the NMOS transistor Trg is on, shifts the data signals input through the data input terminal Data in sequence to the respective circuit stages, based on the clock signals input through the clock input terminal Clk, by well known means. On the other hand, if the voltage of the clock signal terminal Clk is stopped, for example, as kept at the voltage of the logic Low, the two clock transistors Tr5, Tr8 in the even stage unit EV1 etc. become on.

In this arrangement, the even stage unit EV1 composes a CMOS inverter, and a large current flows between the internal power-supply line Vdd and the ground line GND, being the power-supply lines of inverter, when the node N2 being the input thereof saturates due to the dark current to have a potential near the middle potential.

At this time the photosensor circuit, however, brings the transistor Trg into the cut-off state by the control voltage Vg. This prevents the current from being supplied from the power-supply line 72 to the dynamic shift register 71, thereby preventing the large current from flowing because of saturation due to the dark current.

The arrangement for supplying the power through the transistor Trg as a switch element may be applied to only some circuit stages or units of the dynamic shift register 71. In this case, the current based on saturation due to the dark current cannot be decreased to zero, but can be decreased largely.

Since the photosensor circuit as described is so arranged that when the dynamic shift register 71 does not need to operate, the power supply is interrupted to the dynamic shift register by the switch element, so that no large current flows in the power-supply wiring even with saturation of the dynamic shift register 71 due to the dark current and even without always performing the refresh operation of the dynamic shift register 71.

Accordingly, the present embodiment enables to realize the integrated circuit apparatus with high reliability as a photosensor circuit, which prevents an increase of waste current consumption, which could be caused by always performing the refresh operation of the dynamic shift register, by such simple circuit structure that the switch element interrupts the power supplied to the dynamic shift register.

It is noted that the present invention is by no means limited to the above embodiments, but involves a variety of modifications. For example, the above various embodiments used the p-type MOS transistors as switch elements. However, n-type MOS transistors having the conduction type opposite thereto may be employed. In this case, in each node of shift register 11 receiving the data signal, the ON data corresponds to the physical High state of data signal while the OFF data to the physical Low state of data signal.

What is claimed is:

1. A photosensor circuit comprising:
   a plurality of light receiving elements for detecting incident light;
   a plurality of output terminals for outputting photocurrents generated in said plurality of light receiving elements;
   a plurality of switches for selecting connection between said light receiving element and said output terminal in all combinations of said plurality of light receiving elements and said plurality of output terminals; and
   a shift register comprised of a plurality of nodes each controlling on/off of said plurality of switches.

2. The photosensor circuit according to claim 1, wherein a number of said plurality of light receiving elements and a number of said plurality of output terminals are m and n, respectively, and a number of said plurality of switches and a number of said plurality of nodes in said shift register both are m×n.

3. The photosensor circuit according to claim 1, wherein said plurality of switches are arranged in a matrix of rows and columns corresponding to numbers of said plurality of light receiving elements and said plurality of output terminals.

4. The photosensor circuit according to claim 1, further comprising a plurality of memories each for switching on/off of said plurality of switches, based on data output from said plurality of nodes in said shift register, and a plurality of control circuits for controlling processing of writing the data output from said plurality of nodes in said shift register into said plurality of memories.

5. The photosensor circuit according to claim 4, wherein a number of said plurality of light receiving elements and a number of said plurality of output terminals are m and n, respectively, numbers of said plurality of switches, said plurality of memories, and said plurality of control circuits all are m×n, and a number of said plurality of nodes in said shift register is m.

6. The photosensor circuit according to claim 4, wherein said plurality of control circuits are enable circuits a number of which is coincident to a product of numbers of said plurality of light receiving elements and said plurality of output terminals.

7. The photosensor circuit according to claim 1, wherein said plurality of output terminals comprise a plurality of signal outputting terminals for outputting signal charges generated in said plurality of light receiving elements and a charge draining terminal for draining unnecessary charges generated in said plurality of light receiving elements, and said plurality of switches comprise a plurality of signal outputting switches for selecting connection between said light receiving element and said signal outputting terminal in all combinations of said plurality of light receiving elements and said plurality of signal outputting terminals, and a plurality of charge draining switches for selecting connection between said light receiving element and said charge draining terminal in all combinations of said plurality of light receiving elements and said charge draining terminal.

8. The photosensor circuit according to claim 7, wherein said shift register complementarily controls on/off of said plurality of signal outputting switches and said plurality of charge draining switches.

9. The photosensor circuit according to claim 1, wherein said plurality of light receiving elements are comprised of a plurality of pn junction diodes, each including a dopant diffuse region which is formed on a semiconductor substrate having a first conduction type and which has a second conduction type opposite to said first conduction type, and junction bias voltages between said semiconductor substrate and said plurality of dopant diffuse regions are set substantially at the zero volt.

10. The photosensor circuit according to claim 9, wherein said plurality of switches are comprised of a plurality of MOS transistors comprising respective drain regions and source regions formed on said semiconductor substrate and having said second conduction type, and junction bias voltages between said semiconductor substrate and, said plurality of drain regions and said plurality of source regions, are set substantially at the zero volt.

11. The photosensor circuit according to claim 10, wherein said plurality of output terminals comprise a plurality of signal outputting terminals for outputting signal charges generated in said plurality of light receiving elements and a charge draining terminal for draining unnecessary charges generated in said plurality of light receiving elements, and said plurality of switches comprise a plurality of signal outputting switches for selecting connection between said light receiving element and said signal outputting terminal in all combinations of said plurality of light receiving elements and said plurality of signal outputting terminals, and a plurality of charge draining switches for selecting connection between said light receiving element and said charge draining terminal in all combinations of said plurality of light receiving elements and said charge draining terminal, and wherein said semiconductor substrate and said charge draining terminal are connected to a substrate bias potential source.

12. The photosensor circuit according to claim 11, wherein said plurality of signal outputting terminals are connected through a resistance element to said substrate bias potential source.

13. The photosensor circuit according to claim 1, wherein said plurality of light receiving elements, said plurality of output terminals, said plurality of switches, and said shift register are constructed as an integrated circuit apparatus formed on a common chip, said shift register is constructed as a dynamic shift register, which comprises a first power-supply line connected to a first external connection terminal, and said plurality of light receiving elements and said plurality of switches comprise a second power-supply line connected to a second external connection terminal different from said first external connection terminal and separated from said first power-supply line.

14. The photosensor circuit according to claim 13, wherein said shift register comprises a first power-supply terminal and a first common or ground terminal as said first external connection terminal and wherein said plurality of light receiving elements and said plurality of switches comprise a second power-supply terminal independent of said first power-supply terminal and a second common or ground terminal independent of said first common or ground terminal, as said second external connection terminal.

15. The photosensor circuit according to claim 1, further comprising a switch element different from said plurality of switches, disposed between power-supply terminals and power-supply lines of said shift register and arranged as capable of being turned on or off based on a control signal input from the outside, said plurality of light receiving elements, said plurality of output terminals, said plurality of switches, and said shift register are constructed as an integrated circuit apparatus formed on a common chip, said shift register is constructed as a dynamic shift register, and said switch element selects connection or interruption of power supply to said shift register so as to control connection of said shift register to said plurality of light receiving elements and said plurality of swithes.

16. The photosensor circuit according to claim 15, wherein said shift register is constructed of a plurality of circuit stages comprising inverters, as continuously connected, and said switch element selects power supply to at least one of the inverters in said plurality of circuit stages in said shift register.

* * * * *